United States Patent [19]

Wong et al.

[11] 4,449,806
[45] May 22, 1984

[54] FILM ADVANCE MECHANISM FOR DISC CAMERA

[75] Inventors: Wan C. Wong, North Point, Hong Kong; Shigeru Oshima, Tokyo, Japan

[73] Assignee: W. Haking Enterprises Limited, Hong Kong, Hong Kong

[21] Appl. No.: 499,906

[22] Filed: Jun. 1, 1983

[51] Int. Cl.³ .................... G03B 1/00; G03B 19/02
[52] U.S. Cl. ................................ 354/121; 354/173.1
[58] Field of Search ............. 354/121, 173, 174, 203, 354/170, 171; 352/102, 103; 350/134

[56] References Cited

U.S. PATENT DOCUMENTS

| | | | |
|---|---|---|---|
| 708,148 | 9/1902 | Kamm | 352/102 |
| 2,625,087 | 1/1953 | Steineck . | |
| 2,764,911 | 10/1956 | Smith . | |
| 4,152,062 | 5/1979 | Kobori | 354/203 |
| 4,194,822 | 3/1980 | Sethi | 354/121 |
| 4,202,614 | 5/1980 | Harvey | 354/121 |
| 4,290,676 | 9/1981 | Hozman | 354/121 |
| 4,361,387 | 11/1982 | Cloutier | 354/173 X |
| 4,382,668 | 5/1983 | Umehara et al. | 354/121 |

*Primary Examiner*—John Gonzales
*Attorney, Agent, or Firm*—Wallenstein, Wagner, Hattis, Strampel & Aubel

[57] ABSTRACT

A disc camera advances a film disc by an oscillating pawl engaging the disc film notches previously used for indexing. The pawl is carried on a member pivotably mounted on the side of the rear film chamber wall remote from the chamber and passing through an opening in this wall. The limits of movement of this member are determined by the height of a lobe of a rotating cam driving the pawl system and by other mechanical limit stops. An end-of-film sensing pin is provided which passes through the rear film chamber wall of the camera and engages the face of the film disc hub directly. When the pin drops into the film disc hub, the film advance motor circuit is rendered inoperative. A single printed circuit board placed near and parallel to the side of the film chamber wall remote from the film chamber carries the DC motor, shutter-cocking and the pawl-oscillating mechanism. The pawl carrying member is pivoted on this wall. A film flattening shroud frame on the rear chamber wall has only its tangentially disposed faces or edges contacting the film disc so that the other two margins thereof do not contact the portion of the film to be exposed during film advancement.

14 Claims, 23 Drawing Figures

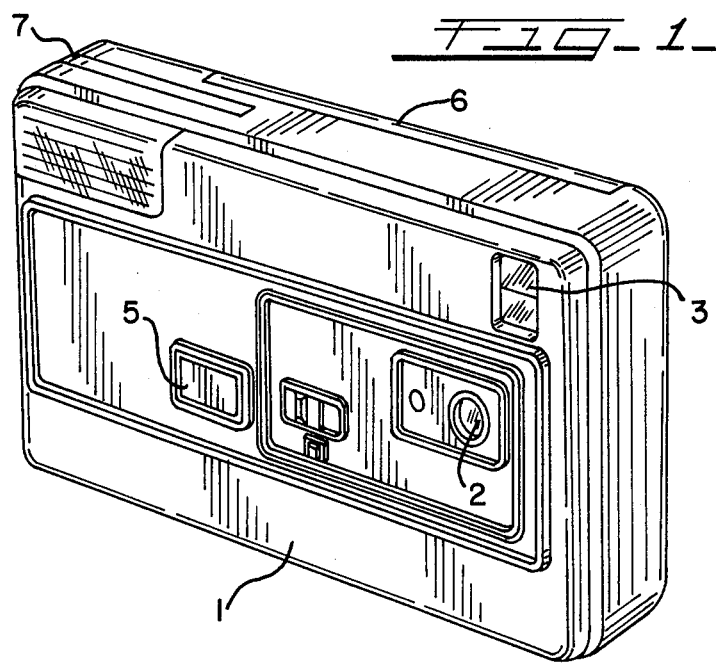
FIG_1_
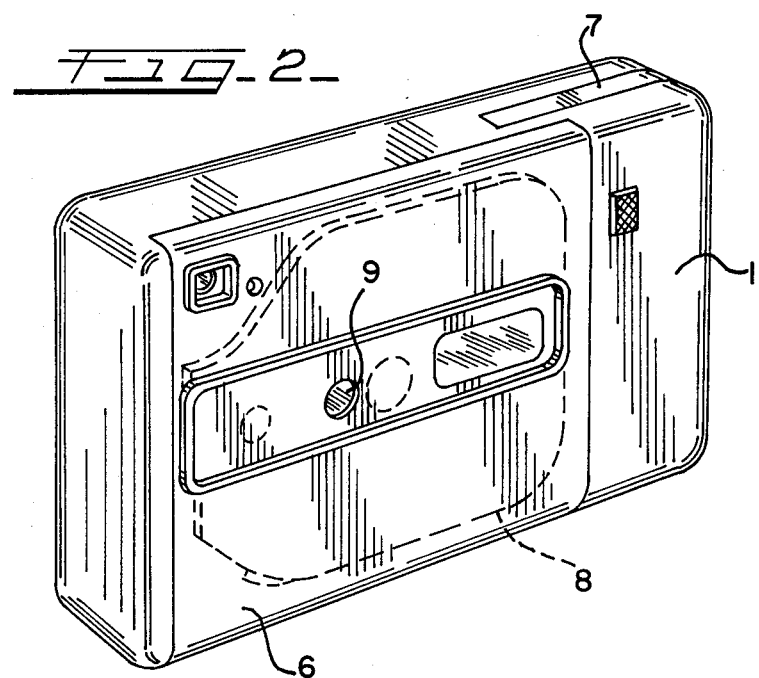
FIG_2_

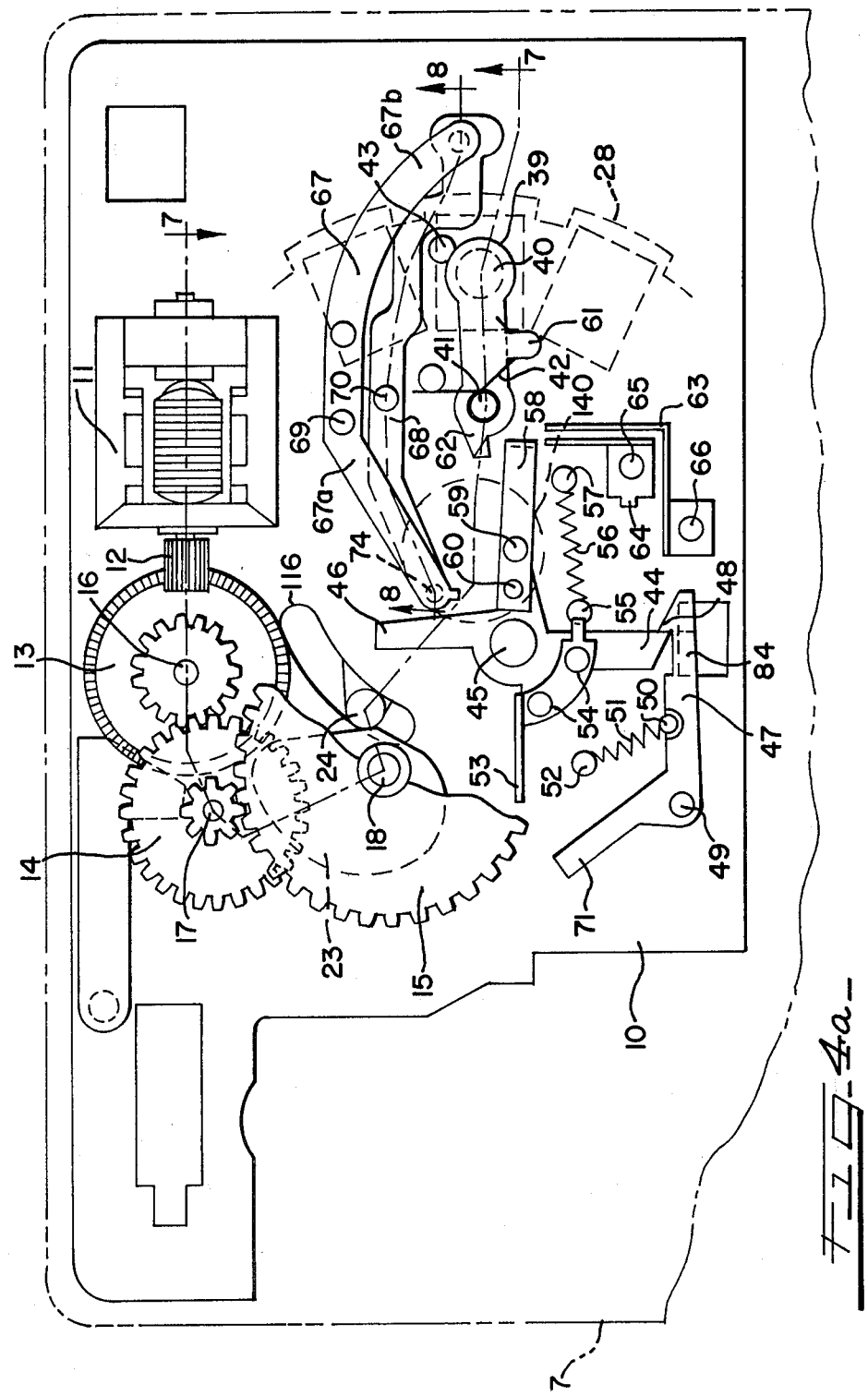

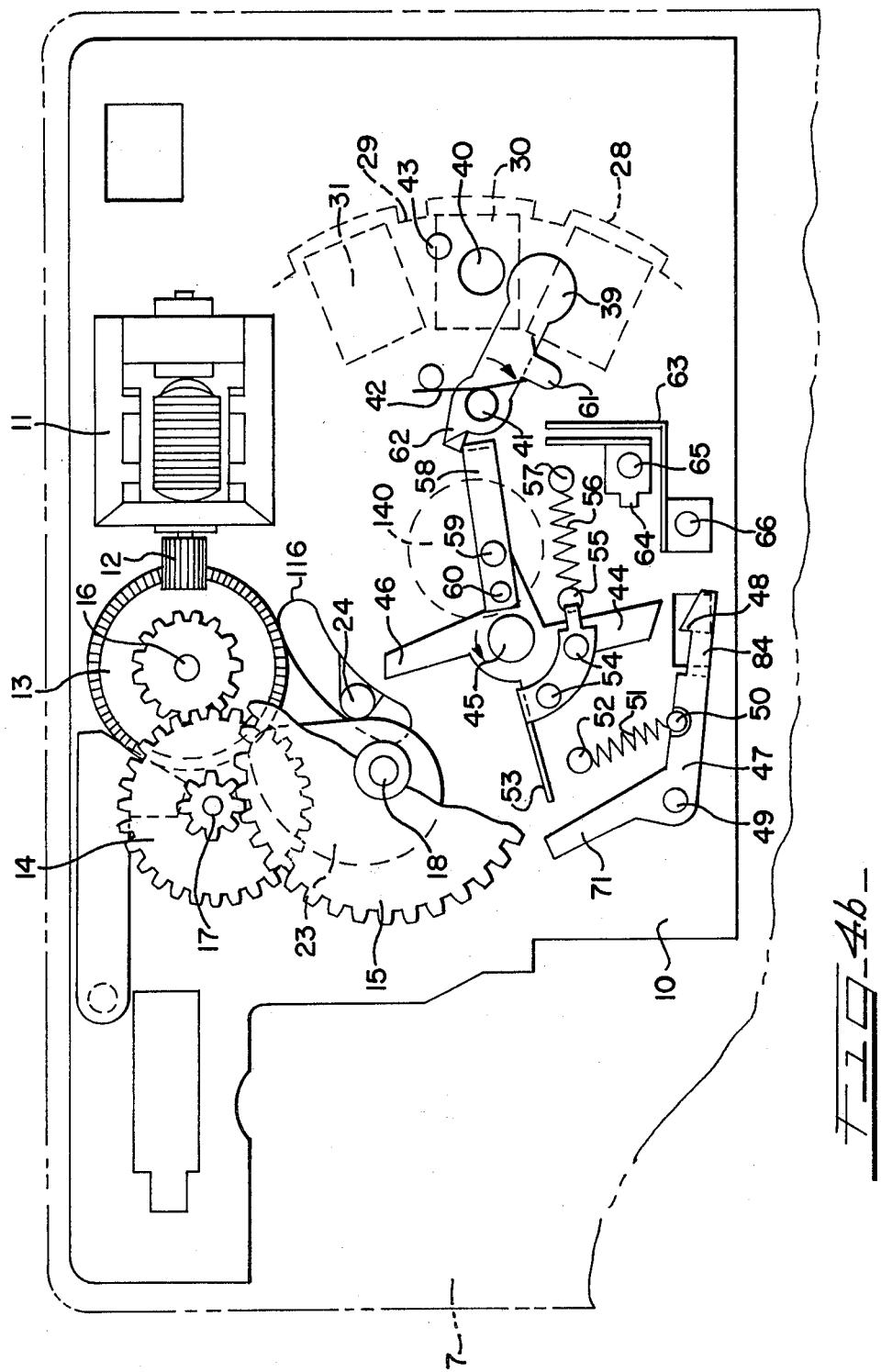

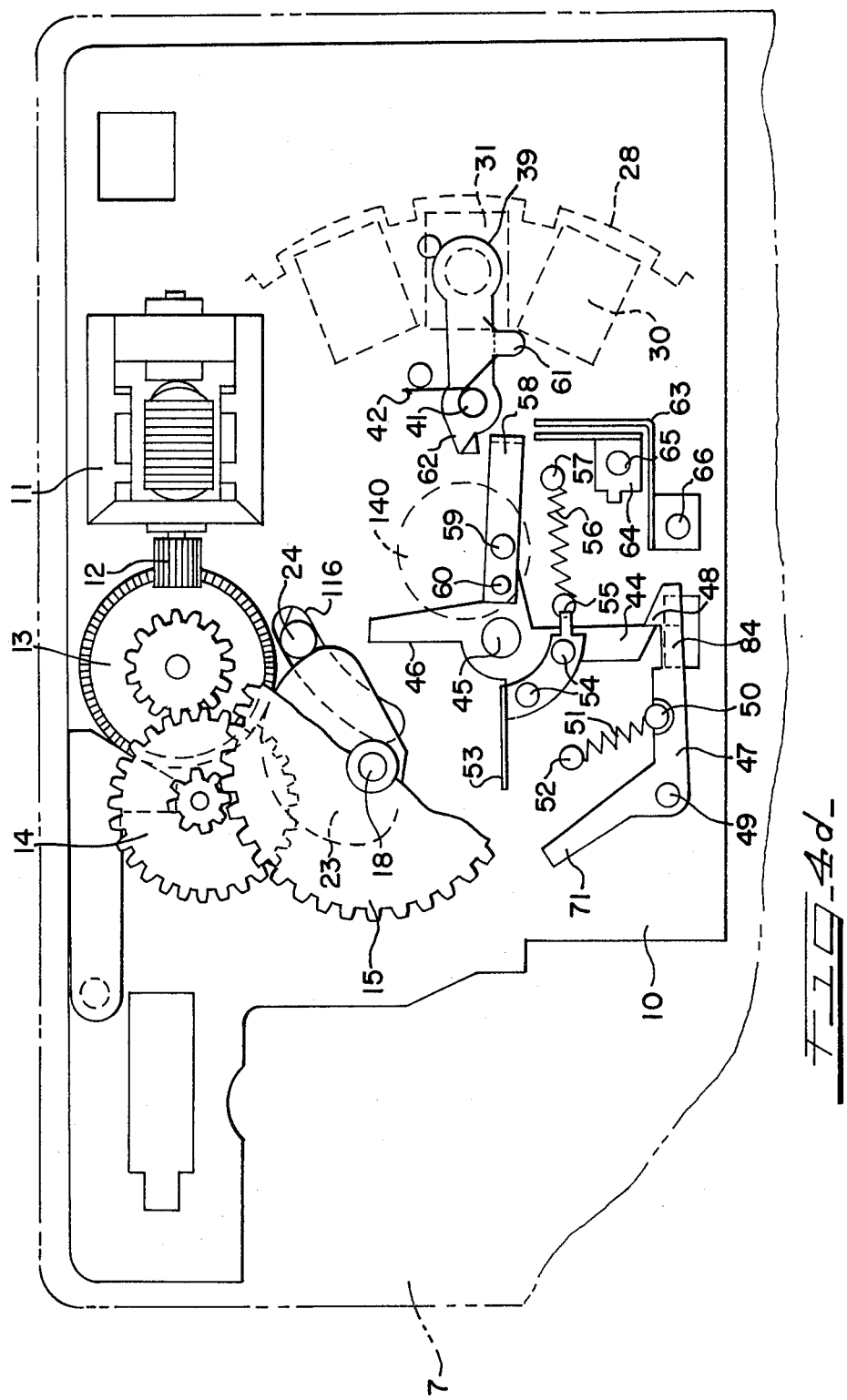

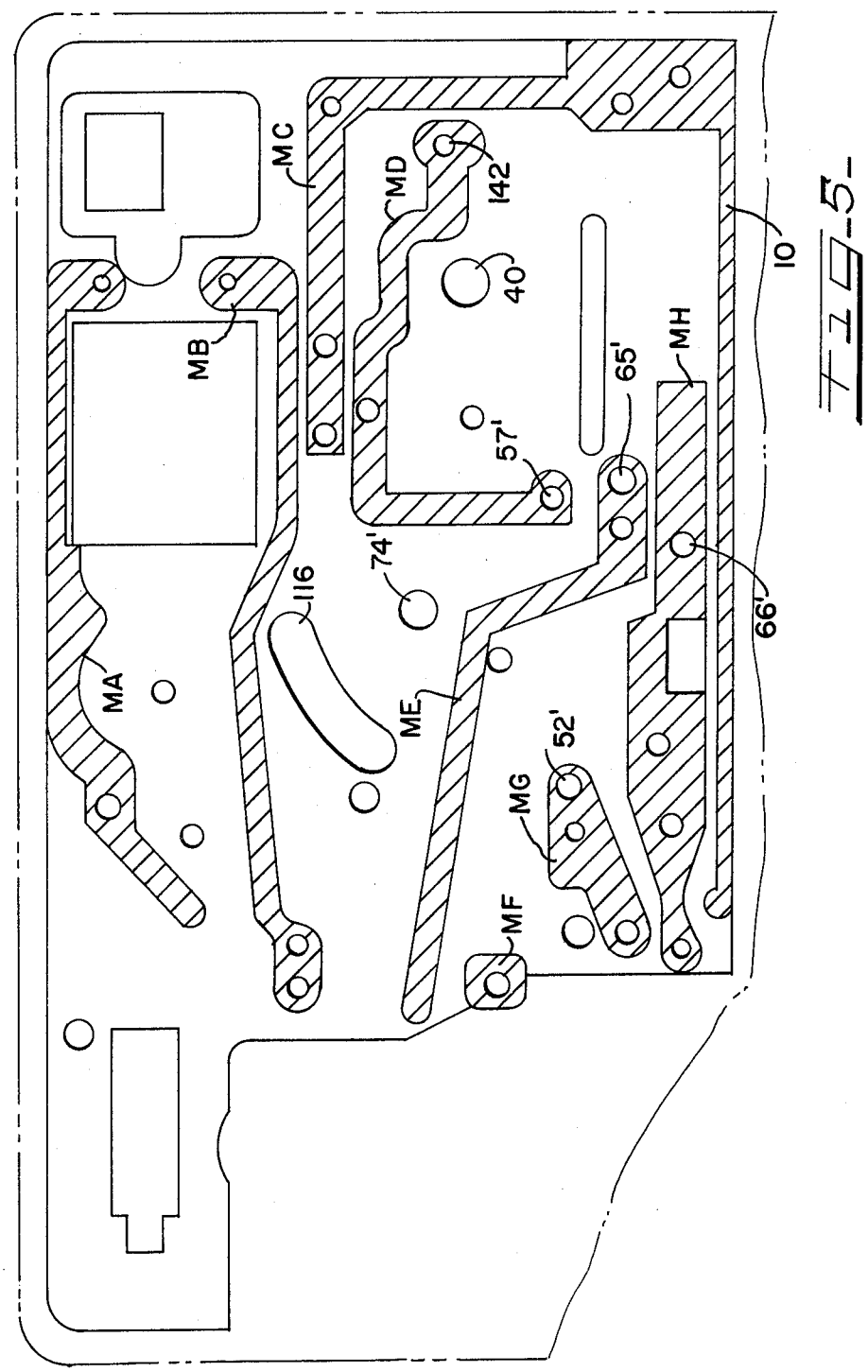

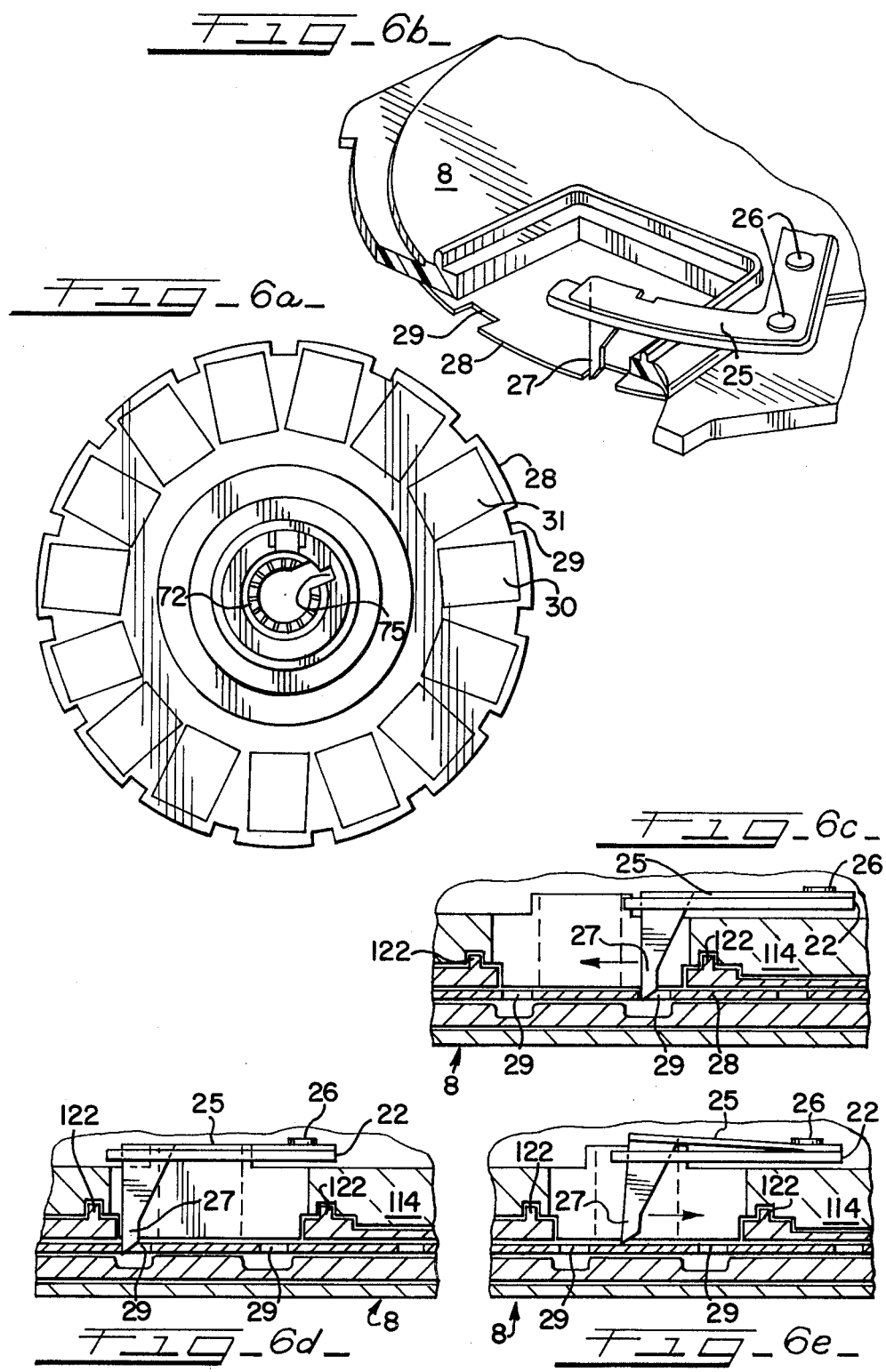

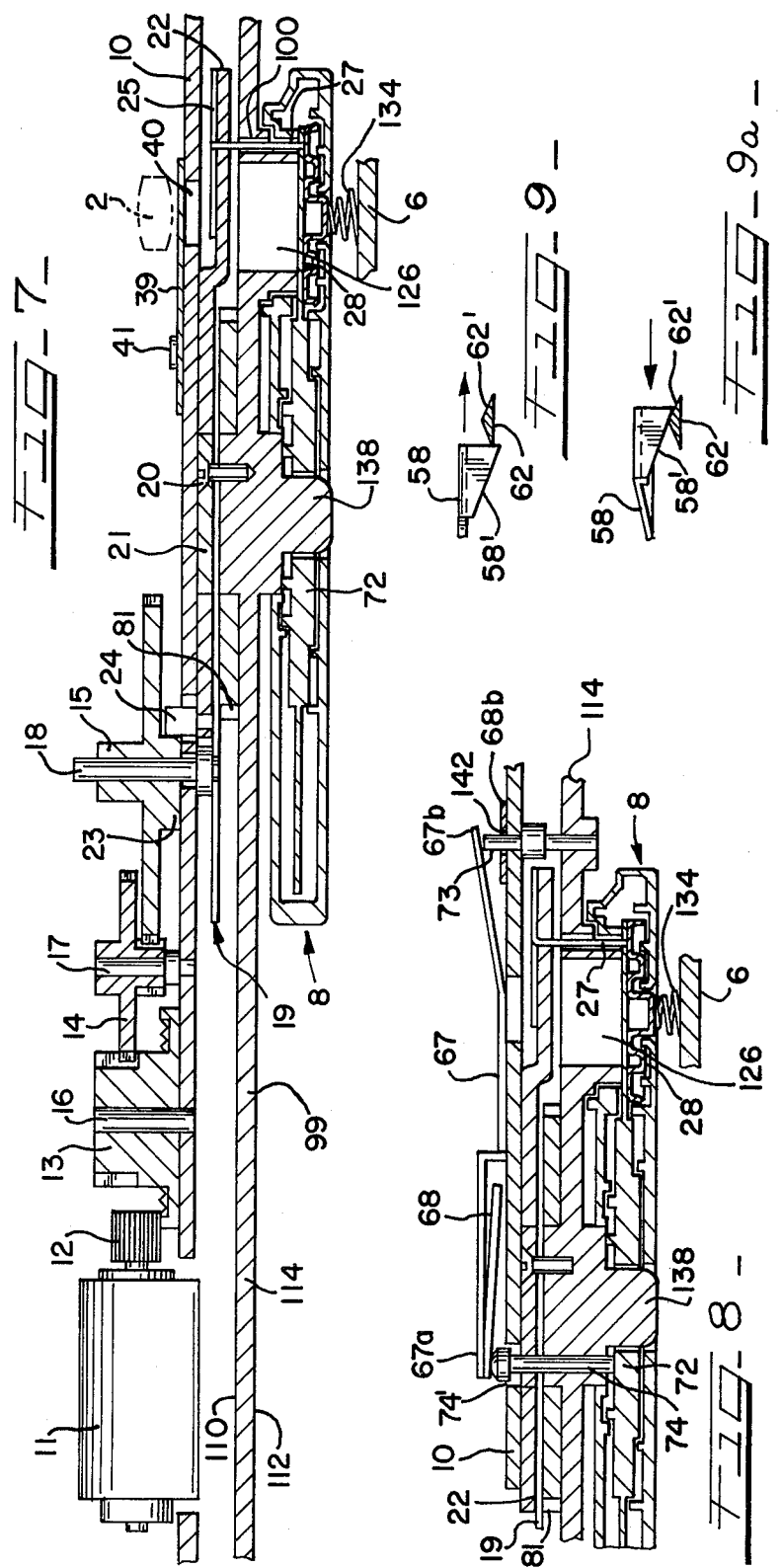

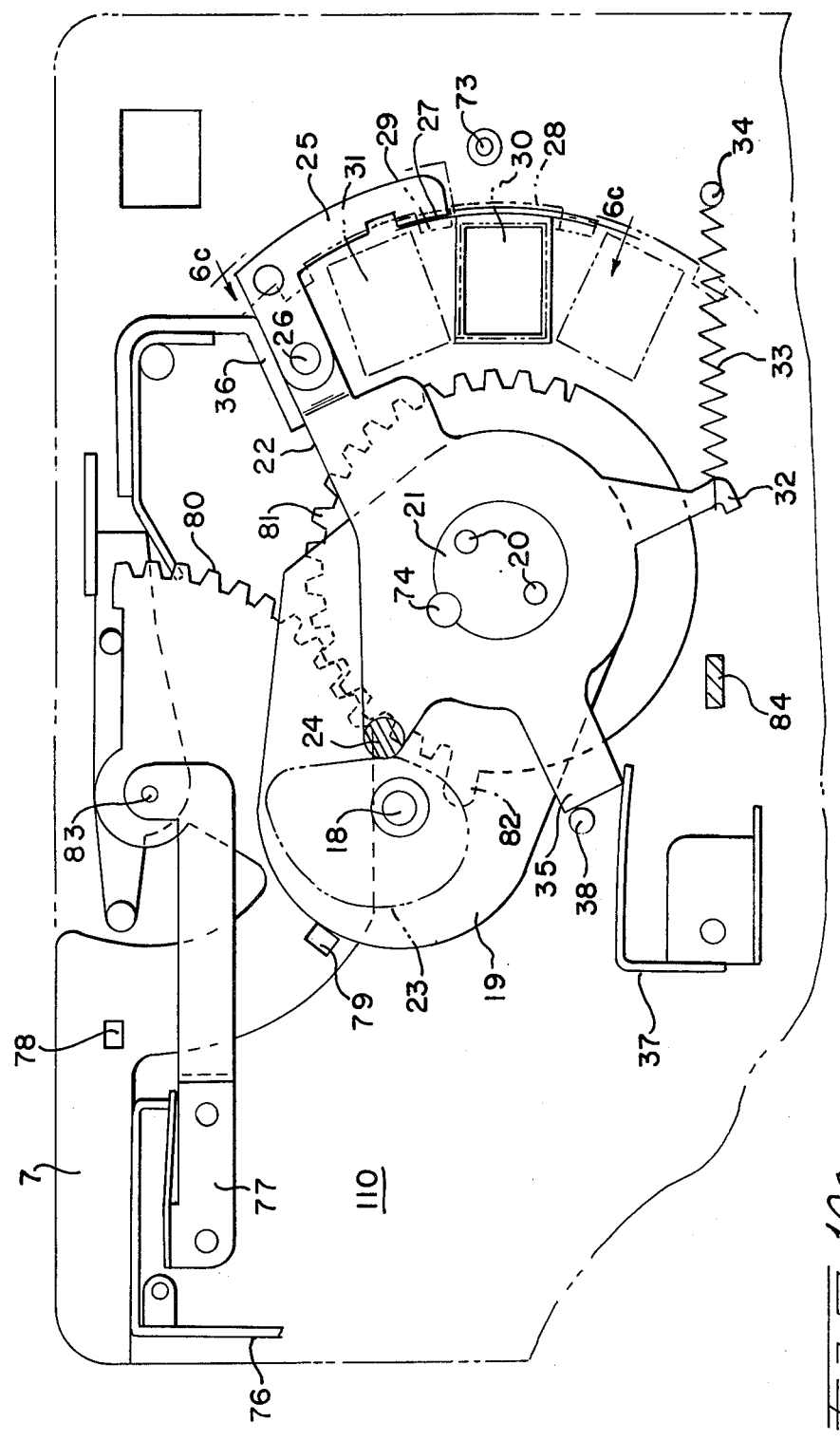

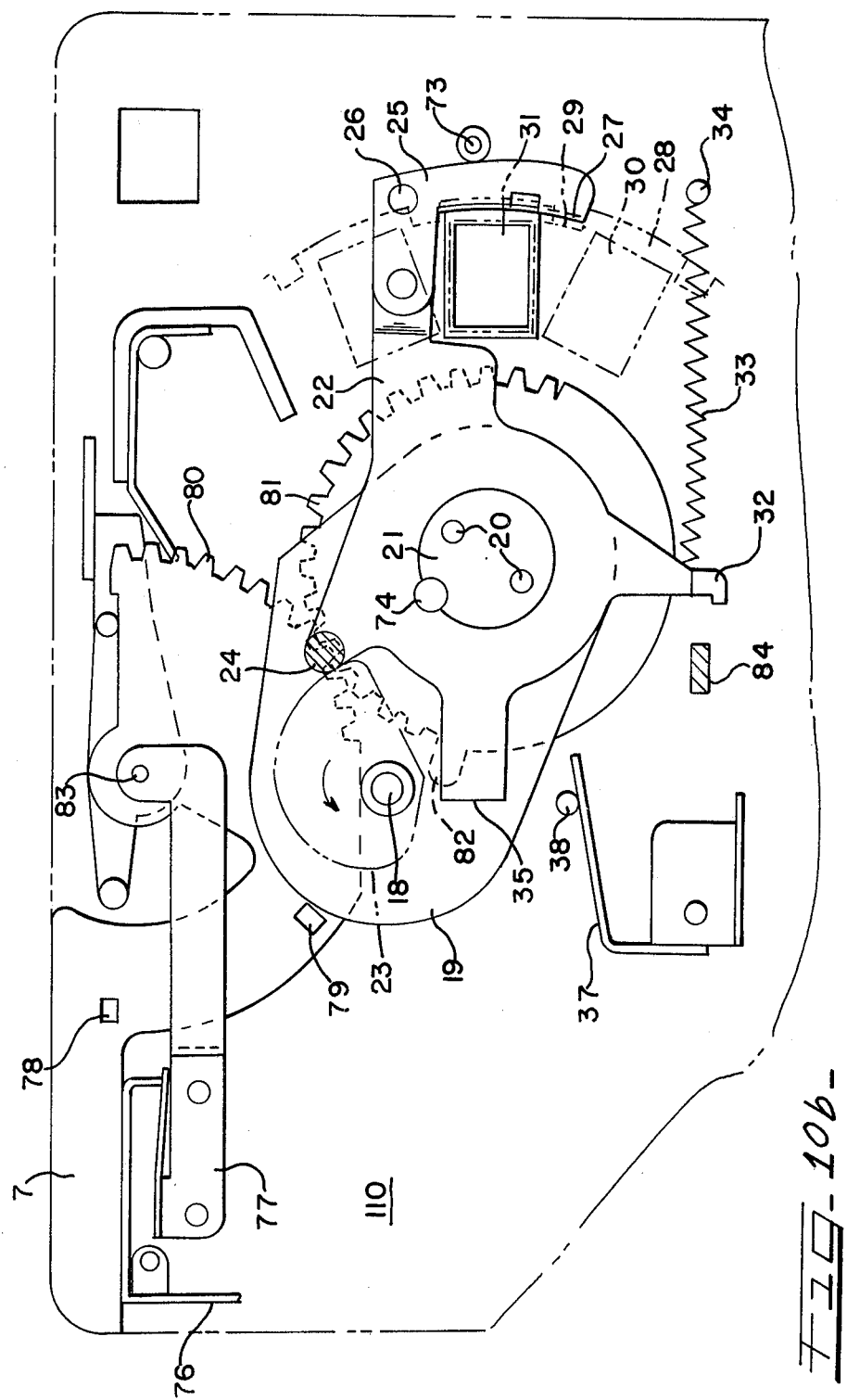

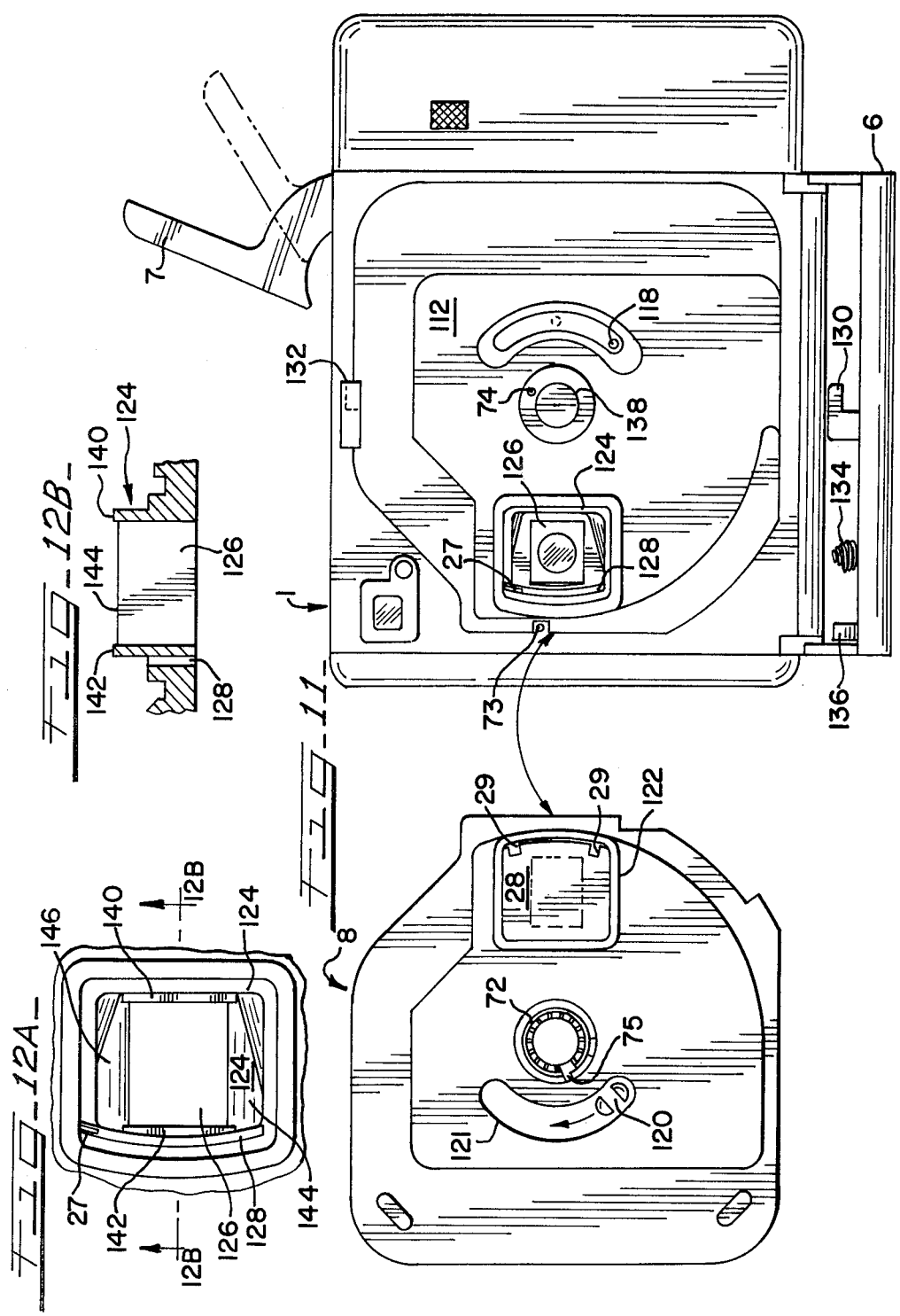

FILM ADVANCE MECHANISM FOR DISC CAMERA

TECHNICAL FIELD OF THE INVENTION

The technical field of the invention is still cameras, in particular automatic still cameras employing the standard Kodak disc film cassettes.

BACKGROUND OF THE INVENTION

Such cassettes have a thin cassette housing with a circular film disc having a notched periphery and a slotted central hub-receiving opening. The film disc is rotatably mounted in a film chamber in the housing. In prior art camera designs, the film disc central opening fits over a motor driven hub projecting from the rear vertical wall of the film chamber.

A common design objective in electric motor driven cameras is rapid film advance and shutter recocking between successive exposures, in order that a rapid series of sequential pictures may be obtained. Because of the extremely close interframe spacing on the normal Kodak disc film format, the film advance must be very precisely regulated so as to prevent overlapping exposures on the film disc. Thus, not only is the film advance operation preferably rapid, but the precision of the advance must be held to very low error. This precise advancement has caused design problems in the prior art disc film cameras, which drive the film disc through a rotatable hub as desribed, requiring mechanically and electrically complex solutions.

For each depression of the shutter release button, the motor must rotate the drive hub an angular amount corresponding to a single frame advancement, while simultaneously cocking the shutter mechanism. To terminate the film advance drive, in some prior art cameras an end-of-frame sensing finger is provided protruding from the rear film chamber wall. The finger is spring loaded and positioned to engage one of the peripheral notches on the film disc which is disposed between each succesive pair of film frames. As the finger slips into a notch, an associated switch is actuated to terminate a motor driven film advancement operation.

Because such switches are necessarily very lightly loaded and have limited travel, they pose not only a manufacturing problem insofar as initial adjustment is concerned, but also tend to be unreliable. Even if the end-of-frame switch is properly adjusted, a residual problem still remains with respect to terminating the motor drive by using such a switch, since simply terminating the drive to the electric motor does not necessarily stop the drive train immediately.

Drive termination could also in principle be achieved by employing a notch-engaging element to lockingly engage the periphery to arrest it in position at the end of a frame advance operation. If film tearing is to be avoided, however, either the hub drive train must stop instantly upon such engagement, or alternatively some form of slip clutch must be inserted to allow a measure of slippage to allow the motor to come to a stop. In the latter case, since the film is in the form of a thin planar disc, an inherently fragile structure, an extremely sensitive clutch would have to be devised. Whether a clutch of requisite sensitivity would remain in proper adjustment over a substantial period of time is questionable. In any case, it would introduce additional complexity to the system.

Alternatively, one would have to make provision for virtually instantaneous motor stoppage, which is not easy to achieve economically in a disc camera application. Moreover, whichever approach is employed, provision would have to be made for disengaging the element from the notch before initiating the next film-advancing rotation, again adding to the complexity of the system.

Another limitation of the aforementioned type of film advance system is that because the film disc of these prior camera are driven from their hub-receiving center openings, a complex multi-layer gearing system is necessary in order to properly gear down the necessarily small and therefore high speed low-torque motors customarily employed to actuate such systems, the small motor size being dictated by space limitations within the camera. Since the output of the gear train drives the film disc only 1/15 of a revolution per frame advance, and since the camera mechanism must actuate a complete resetting of internal switching as well as recocking of the shutter for each frame advance, an intermediate power take-off is necessary at some point in the gear train to actuate this mechanism. These prior art cameras employ a series of camming surfaces on an intermediate gear to achieve these functions. Since many gears are employed, the train is necessarily characterized by excessive space and thickness requirements. To obtain an adequately thin drive system, the procedure employed in such prior art cameras is to mount the power train directly to the side of the film chamber wall remote from the film chamber, and to mount the associated shutter and switch sensing elements on a separate board engagingly disposed over the aforementioned intermediate gear. Not only is the component arrangement on the board quite complex, but the arrangment of parts on the rear camera wall is such as to make it difficult to assemble and disassemble the parts during manufacture or repair of the camera.

An alternative approach to the film advancing problem is disclosed in U.S. Pat. No. 4,382,668, which discloses the use of a stepping motor directly engageable with the hub of the cassette, the motor advancing a fractional rotation with each pulse supplied thereto, so as to advance the film. Such motors are, however, expensive and of rather large diameter, thus occupying a relatively large central area of the drive system so as to preclude use of these portions for related features of the system, e.g. shutter actuation and cocking and similar operations.

There are also disclosed in the art a variety of other cassette indexing systems. For example, U.S. Pat. No. 4,194,822 discloses a cassette having a specially designed hub featuring a series of indentations disposed thereon, the indentations being sequentially engaged by a resilent arm to rotate the disc stepwise to secure frame advance. This cassette is, however, if non-standard design in providing such a feature, and the system disclosed therein is of no relevance to the problem at hand, namely providing a rapid film advance and indexing system capable of employing the conventional widely marketed Kodak cassette, which has no such specially configured hub associated therewith. Similarly, U.S. Pat. No. 4,202,614 discloses another non-standard cassette wherein an eccentric drive pin associated with a central support spindle eccentrically engages a slot in a specially designed cassette hub to advance the film. Similar considerations apply to this approach as well.

Thus, there is a need for a vastly simplified parts arrangement in disc cameras and a film advance system which does not require precise motor shutdown to govern film advance. The present invention provides such a camera and film advance system by providing a substantially less bulky and simplified drive, and wherein most of the major elements of the drive train can be mounted on a single easily mounted and removed board so as to facilitate manufacturing assembly and servicing.

Finally, the film must be properly positioned with respect to the focal plane of the imaging lens. This in practice has mandated the use of a framing shroud extending outwardly from the rear of the rear film chamber wall of the camera, the shroud having a generally planar rectangular outer surface defining a light passage opening within its confines and configured to engage against the film disc by pressing against the same to establish a fixed film exposure plane. Pressure is applied to the opposite side of the film to press it against the shroud frame by means of a spring pressing upon the outside face of the cassette generally along the imaging axis, the flexing of a specially designed thin wall in the cassette being inwardly transmitted to press the film against the rectangular shroud frame surface.

To prevent film scratching during film advance, the prior art cameras use a disengaging linkage which removes the spring pressure during film advance so as to release the film, the pressure being reapplied at the end of each advance. U.S. Pat. No. 4,290,676 discloses a representative prior art system for accomplishing this result. The elimination of such system complexity would be a highly desirable feature in such cameras. The present invention provides such a feature.

SUMMARY OF THE INVENTION

In accordance with one of the features of the invention, instead of using a driven hub to rotate the film disc, the film disc is pivotally supported on a stationary or non-driven hub and the film disc is driven by means engaging the peripheral film disc notches. In accordance with a preferred specific aspect of the invention, the drive means is a cam-driven reciprocating pawl engaging the film disc notches, so that no bulky additional central drive speed reducing gear train is needed. This frees the center portion of the parts-containing compartment on the side of the film chamber wall remote from the film chamber for the addition of other features of the invention. The film disc notch-engaging pawl is preferably carried by a claw member preferably pivotally mounted on the latter side of the film chamber wall, the claw passing through an opening in the wall so that the pawl on the end thereof within the film chamber engages a film disc notch.

In accordance with a more specific aspect of the invention, the pawl is preferably carried on a light spring arm which can readily engage a defining wall of a peripheral film disc notch and when driven in a forward direction advances the film disc one frame distance. The pawl is shaped to readily slip out of the notch when it is moved in the opposite direction. The claw is preferably driven by a reciprocating motion imparted thereto by a cam linkage between the claw and the motor drive elements.

In accordance with a further specific aspect of the invention, the film advance operation is obtained by operating the peripheral drive in two distinct phases. In the advancing phase, the pawl carried by the claw engages a film notch to advance the film disc one frame, the length of the actuation stroke being governed completely by the height of a drive lobe on the cam driving a cam follower on the claw. The forward stroke of the film advance operation is thus limited by purely mechanical means, the motor drive process continuing to a second phase wherein the claw is driven in a reverse or reset direction wherein the light spring carried pawl, because of the configuration thereof, automatically cams itself out of engagement with the film notch. The motor drive power continues to drive the claw in a retract direction to a position wherein the pawl drops into the next film notch to lie disposed generally therewithin. At the end of the retraction stroke with the pawl lying generally disposed within the next film notch, the claw retraction motion is terminated by engagement with a mechanical limit stop, motor rotation continuing for a limited time thereafter, the motor drive being automatically disconnected from the claw system by the action of the claw striking the stop. Thus, by divorcing the motor shutdown time from the advancing phase and referring it instead to the less critical retraction phase, and by governing both the advancing and retract stroke by purely mechanical means, the motor stop timing problem described.

Since the drive force is applied at the periphery of the film, as contrasted with driving the central hub of the film disc, a less bulky system having a smaller number of drive elements is adequate to drive the film advance actuator. By placing the cam and the claw cam follower well outboard of the axis of rotation of the film disc, and by eliminating the central gearing normally associated with the central hub drive system, the central areas within the camera proximate to the axis of rotation of the film disc become available for receiving other parts of the camera.

Thus, according to a further feature of the invention an outwardly spring urged sensing pin is disposed to pass through the rear film chamber wall and constantly engages the film hub surface. An end-of-film condition is signalled to the camera switching system by the passage of the film hub notch past the sensing pin, the sensing pin then releasably dropping into the notch and actuating interior motor drive termination switching. Thus, a simple reliable end-of-film sensing is achieved at minimum cost and maximum simplicity.

Although peripheral drive systems for circular discs are known in the art, their application appears to be almost exclusively associated with transparency film projectors, where the design requirements are substantially different from those required for rotating film discs used in disc cameras. First, it should be recognized that a conventional disc film cassette as marketed has a rotation-freezing feature such that when the cassette retaining pressures on the cartridge are released upon opening the loading door of the camera, a flexed engaging boss integral with the cassette engages the film disc to prevent rotation thereof when the cassette is out of the camera. This guards against accidental rotation of the cassette in handling.

Moreover, a reinsertion feature is required in cameras such that a cassette may be partially exposed, removed from the camera, as for example to test the camera actuation system, and then reinserted to continue with further exposures. In a camera this poses a requirement that an appropriate end-of-film sensing mechanism be provided which will sense the exposure of the last frame in the cassette, thereupon inhibiting further film advance. All of this must be accomplished while the film is still encased within its associated cassette.

Projectors, on the other hand, are systems which actuate a disc after it has been removed from the surrounding cassette, so that complete access to the film disc and any portion of the hub thereof is available for position sensing and advancing. Moreover, a projector need not provide within tight space limitations a shutter actuation and recocking system. Thus, the design latitudes allowed in projection systems are vastly simpler than those intended to the design of thin, small cameras designed to be carried in the user's pocket. As an example of the related projector art, U.S. Pat. No. 2,764,911 discloses a projector for projecting transparencies mounted on a transparency-holding reel, rotation being imparted to the reel by engagement of a arcuate motion of a peripherally disposed claw engaging a series of indentations close to the periphery of the reel.

In accordance with a further feature of the invention, as a further result of eliminating the cluster of central gearing associated with prior hub film advance systems, the resulting cleared central area on the motor drive board allows the entire shutter and shutter cocking system as well as preferably the pawl oscillation mechanism to be disposed completely on a single board, preferably the printed circuit board containing all of the electrical circuits for the camera. This board is preferably located near and parallel to the rear side of the film chamber wall where it is readily excessible, and easily removed with minimum disconnection of leads for servicing requiring rear access to the board.

In accordance with the still further feature of the invention, a specially configured rearwardly extending rectangular light shroud frame is configured to run through the exposure window of the cassette and press against the film disc. Only the radially spaced peripheral margins of the frame are designed to engage the film disc. These margins are disposed outside the imaging area, so that any film scratching that occurs as a result of the shroud frame engagement with the film lies outside of the imaging area. The other two margins of the shroud frame are recessed from the film disc plane.

The camera of the present invention is thus overall greatly simplified in construction, more readily serviced, and has a highly reliable and precise indexing film advance system, resulting in a camera that is not only markedly less expensive than comparable central drive systems, but which is substantially more reliable in its operation.

Other advantages and features of the invention will become apparent upon making reference to the description to follow, the drawings, and the claims.

DESCRIPTION OF DRAWINGS

FIG. 1 is a perspective front view of a disc camera.

FIG. 2 is a perspective view of the same camera showing the location of an inserted disc film cartrige in dotted outline.

FIGS. 4a–4d are plan views of a motor drive system and shutter actuation and cocking system as well as elements of a cassette sensing switch system mounted on top of a printed circuit board mounted within the camera of FIG. 1. In FIGS. 4b–4c, showing the mechanism at intermediate stages of actuation, details of the strap-like switch interconnection leads are deleted for simplicity.

FIG. 5 is a plan view of the circuit board of FIGS. 4a–4d before installation of components thereon, showing the on-board metalization used to secure electrical interconnections.

FIG. 6a is a plan view of a film disc and mounting hub as commonly manufactured and installed in disc film cassettes. FIG. 6b is a perspective view of the top portion of a disc film cassette showing a portion of a claw arm having an engagement tip thereon engaging a notch in the film disc so as to advance it. FIGS. 6c–6e are cross section views showing details of the claw engagement and retraction system of FIG. 6b in various stages of the film advancing operation.

FIG. 7 is a fold-out cross section view taken generally along lines 7—7 of FIG. 4a showing the vertical placement of components and the general interrelationship of elements of the motor drive train.

FIG. 8 is a similar view as in FIG. 7, but taken generally along lines 8—8 of FIG. 4a.

FIGS. 9 and 9a show details of a shutter actuator engagement with a shutter anvil during shutter actuation and shutter recock operations respectively.

FIGS. 10a and 10b are plan views of the interior rear surface of the rear wall of the camera of FIG. 2 showing details of motor drive engagement via a cam with a cam follower carrying a rotatingly actuating the film propulsion claw of FIGS. 6a–6d at the extreme limits of claw travel during the film advance operation.

FIG. 11 shows a rear plan view of the camera shown in FIG. 2 with a rear loading door in the open position, showing details of the interior of the cassette chamber, and a standard cassette placed next to the camera preparatory to loading, and showing the general configuration of interacting elements of the two.

FIGS. 12A and 12B are plan and cross section views of a film shroud configured to engage the exposure aperture of the cassette shown in FIG. 11.

DESCRIPTION OF THE INVENTION

Figure 3:
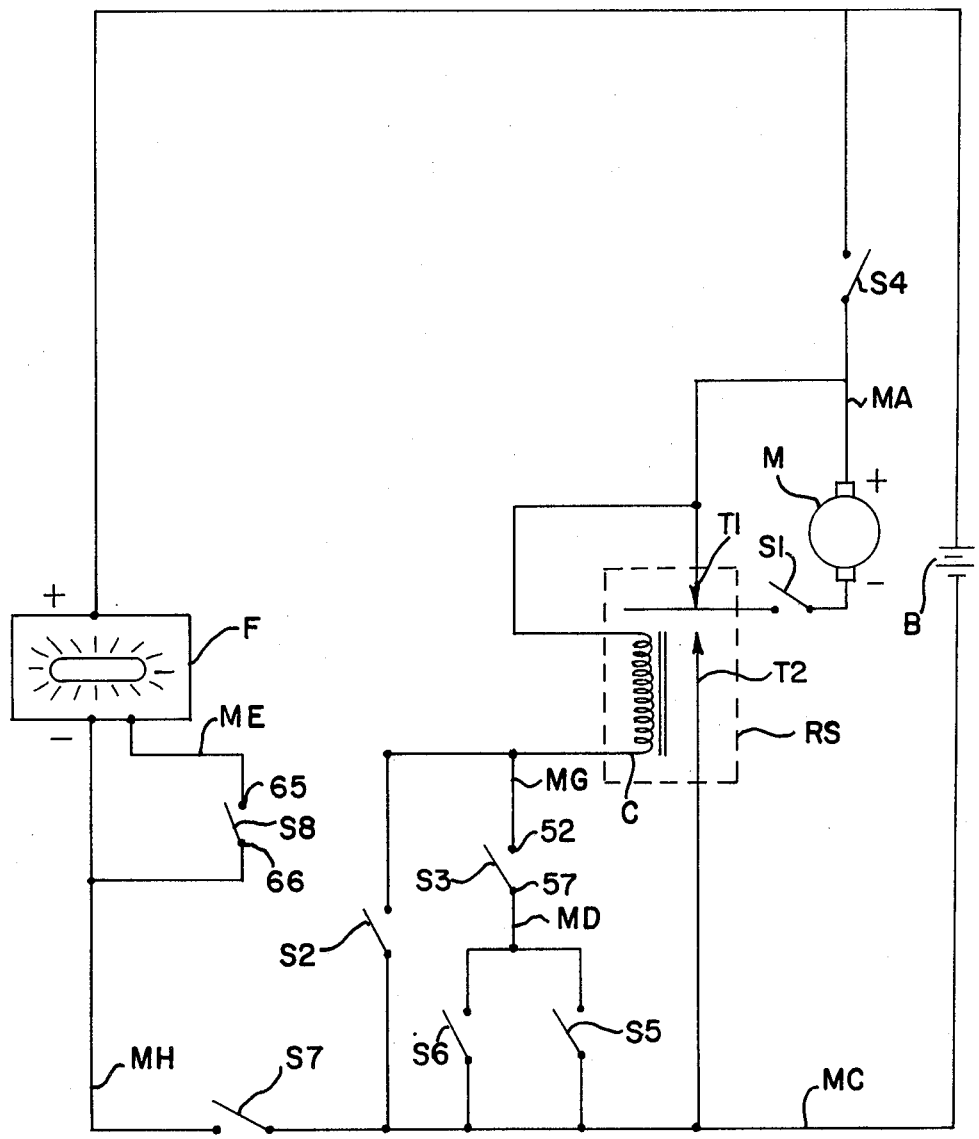
FIG. 3 is a schematic circuit of the principal elements of the electrical system of the camera.

FIG. 1 shows a front pictorial of a disc camera 1 of the present invention which contains a picture-taking lens 2 disposed near to the right-hand edge of the camera. A view-finder objective 3 is in the top right-hand corner and the window 4 of a built-in electronic flash element is in the top left-hand corner. The front face also contains a shutter release button 5 whose position is relatively in the central part of the front face as shown in FIG. 1.

On the back of the camera 1 is a film chamber door 6 which is also illustrated in FIG. 2 showing a back pictorial view of the camera 1. The numeral 7 indicates a latching lever which is manually operable by the camera user to latch closed or unlatched open the film chamber door 6. FIG. 2 also shows in dotted lines a disc film cartridge 8 which has been loaded into the film chamber. The window 9 allows the camera user to observe the number of the fresh exposure frame which has just been transported into the examct imaging position and ready for picture-taking.

FIG. 11 shows a rear view of the camera of FIGS. 1 and 2 with the film chamber door 6 opened and latching lever 7 extended in the unlocked position. As will subsequently be discussed in more detail, when the chamber door 6 is closed and the latching lever 7 is rotated clockwise as viewed in FIG. 11, a door latch hook 130 affixed to the door 6 passing through door latch aperture 132 is captively engaged by interior elements associated with the latching lever 7.

FIG. 11 shows a film cassette 8 and FIG. 6A shows the elements of the film disc 28 enclosed therein. The cassette 8 contains a film disc 28 and an interior cover slide rotatably affixed within the cassette 8 to rotate about a film disc hub 72, the rotation being secured by engagement of a pin 118 extending to the rear surface 112 of the camera and engaging a slide slot 120 movably disposed within a cutout 121. The pin 118 is rotated to engagingly move the dark slide into a film covering position when the latching lever 71 is extended, so that the film will not be light struck when removed. For simplicity most of the dark slide has been cut away in the view of the cassette so as to show the surface of the film 28, and in particular the film notches 29 disposed thereabout shown also in FIG. 6A.

The film is inserted by rotating about vertical axis as indicated in FIG. 11 to engage with the surface 112 of the rear wall, light sealing being facilitated by interlocking engagement with an integral shroud 122 extending outward from the face of the cassette 8, and a complementary shroud 124 extending from the rear wall 112 of the camera housing. A film pressure spring 134 mounted on the forward surface of the rear door 6 comes to bear against the back surface of the cassette 8 to apply a film flattening pressure against the film 28 so as to bring it into contact with the rearmost faces of the shroud 124. A cassette retaining spring 136 adds pressure to the rear face of the cassette 8 when the door 6 is closed to hold the cassette firmly in place in the chamber formed by the rear wall 112 and rear door 6, the presence of a film cassette in the chamber being communicated to interior switching mechanisms by means of a cassette detector pin 73.

The cassette 8 has an eccentric slot-like groove extending therethrough, the hub 72 of the cassette being configured to slidingly rotatingly engage a cylindrical cassette spindle 138 extending rearwardly from the rear camera wall 112. The cassette hub 72 is freely rotatable about the spindle 138. An end-of-film sensing pin 74 extends through the rear wall 112 of the camera housing to press against the interior face of the cassette hub 72, the pin being reciprocatingly mounted and spring urged outward and to the rear, and positioned so that as the film 28 is successively advanced between exposures, after the last exposure the slot 75 in the hub 72 will be located immediately opposite the end-of-film sensing pin 74, allowing it to travel outward. As will subsequently be discussed, this actuates internal switching to terminate further camera actuation.

Immediately adjacent the rear wall aperture 126 defining the imaging area on the film 28 is a second aperture arcuately disposed about the center of the spindle 138, through which passes a claw tip 127 used to engage with notches 29 of the film 28 to advance the film. Details of the cooperation of these various mechanisms, linkages, and switches will be discussed subsequently.

FIG. 3 shows the circuit diagram of the camera 1. The circuit has two main parts in parallel. The first part forms the electronic flash and the second part is for the control of film-transport operations. The functions of the individual connection elements and switches will be described later.

FIG. 4a is a plan view of the interior of the camera 1 showing a film-transport mechanism and a shutter mechanism which are revealed after the front panel has been removed, i.e. directly behind the forward surface of FIG. 1. Most parts of the film-transport mechanism and the entire shutter mechanism are built on top of a baseplate 10, which is also a printed circuit board made of a stiffened type of material. The same baseplate 10 is also shown in FIG. 5 before assembly. The various shaded portions are the printed metallizations that serve as electrical connections, which would otherwise be made by means of electrical wirings and contact plates.

The number of wiring operations and contact plates is thus reduced to a minimum by the use of the dual-purpose baseplate 10. The designated circuit pads MA–MH in FIG. 5 correspond to the similarly designated interconnection lines in the circuit diagram of FIG. 3.

Figure 4C:
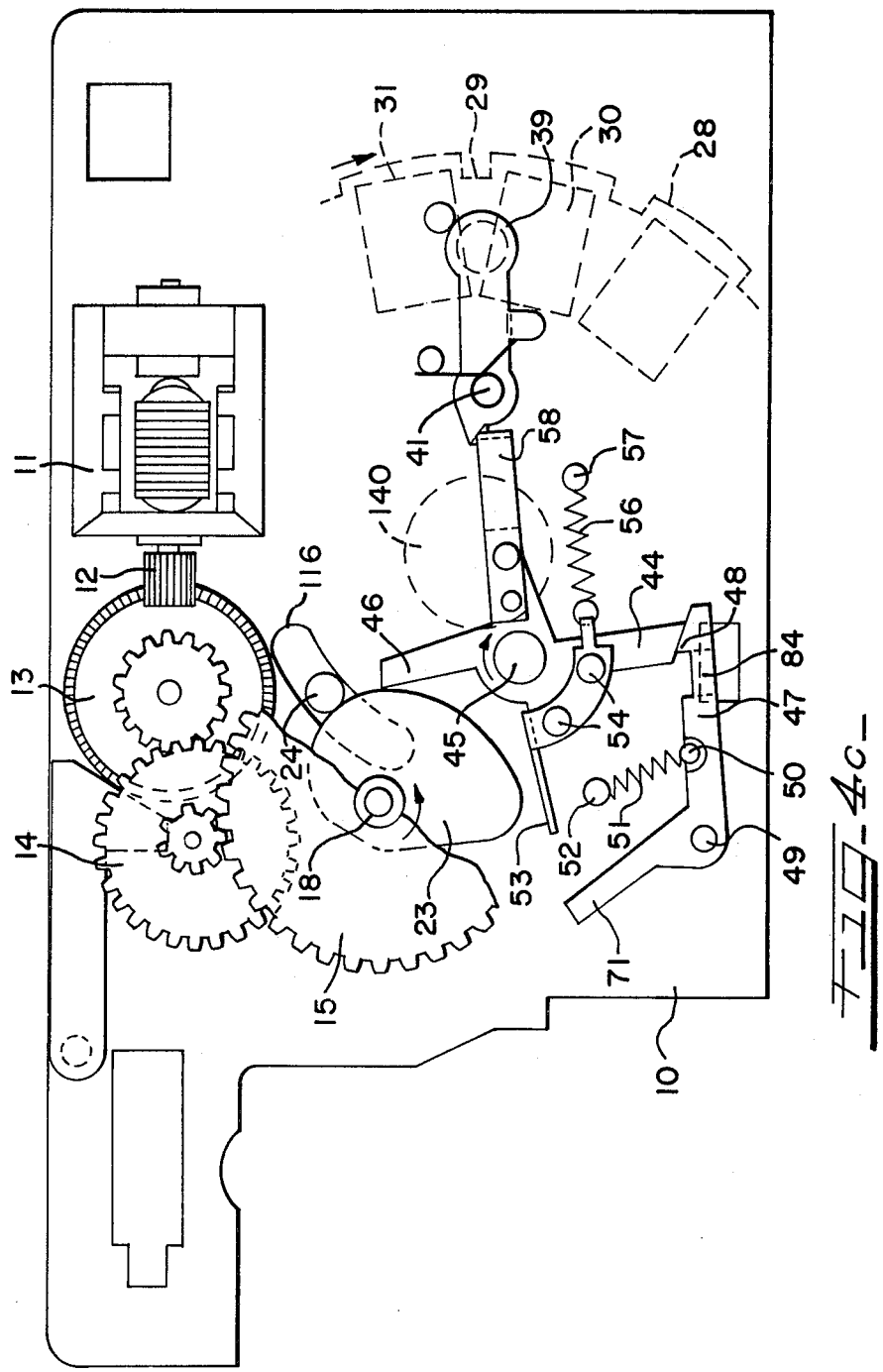
Figure 10C:
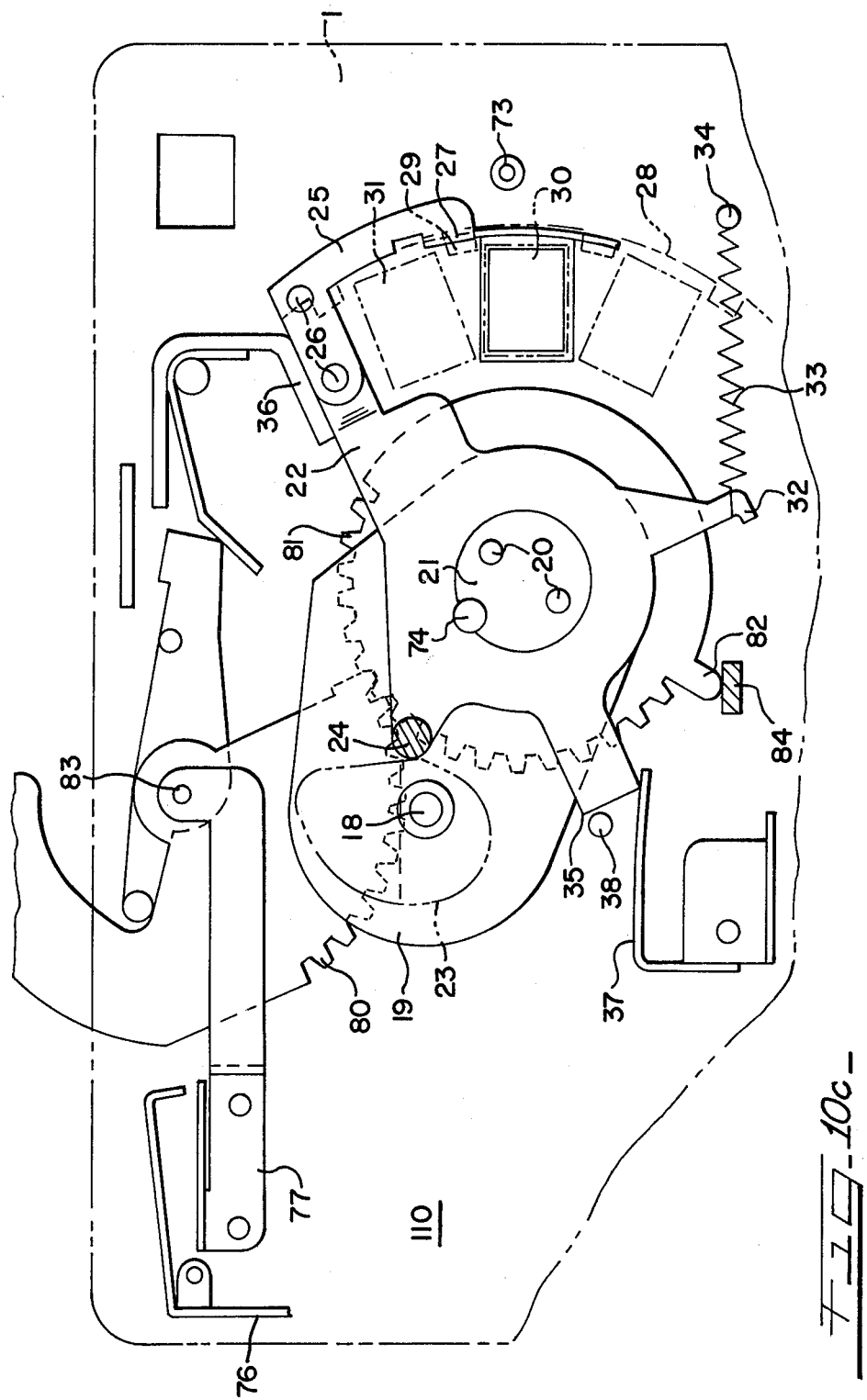
FIG. 10c is similar to the view of FIGS. 10a and 10b, showing details of rotary actuation of a latch mechanism for the camera rear loading system.

Behind the baseplate 10 of FIG. 4a is the interior surface 110 of the rear wall. FIGS. 10a–10c show various features of a film advancing system and loading door latch release mechanism mounted on this surface. Details of these structures will be subsequently discussed. At this point it should simply be noted that the film advance system derives its actuation from a cam 23 rotatably bearing upon a cam pin 24. The cam pin 24 reaches forward through an arcuate cam pin slot 116 in the baseplate 10 of FIGS. 4a–4c. The cam 23 is disposed resting against the upper surface of the baseplate 10 of FIG. 4a, sequentially engaging the cam pin 24 to actuate the film advance as well as a shutter release and cocking mechanism mounted on the top of the base board.

With reference to FIGS. 1, 2, 4a, 10a, and 11, during the exposure process light from the scene to be photographed passes through the lens 2 on the front of the camera, then through a shutter window 40 on the baseplate 10, exiting through a rear wall aperture 126 to be focused on an area of film residing behind a window 153 in the cassette 8. The general functional layout of the various systems of the camera, the individual subsystems will now be discussed in detail.

Motor drive power is derived from a motor 11 mounted on the baseplate 10 shown in FIG. 4a. A pinion gear 12 mounted on the motor shaft of the motor 11 drives a crown gear 13 which in turn drives a cam gear 15 through an intermediate transmission gear 14. The cam gear 15 has a cam 23 affixed to the lower surface thereof. The gear ratio of the cam gear 15 to that of the pinion gear 12 is large, so that the cam gear 15 is driven at a relatively slow speed for film transport and cocking of the shutter mechanism. The crown gear 13 and the transmission gear 14 are rotatable about center axles 16 and 17 respectively. The motor 11 and the axles 16 and 17 are all mounted on the baseplate 10. The cam gear 15 is rotatable about a center axle 18 which is erected on a metal bracket 19 located underneath, i.e. rearward of, the baseplate 10 (see FIG. 10A). The cam gear 15 rotates with the cam 23 bearing against the upper surface of the baseplate 10, all motive power for film advance and shutter cocking being derived by engagement with this cam 23.

Having discussed the motor power takeoff systems in broad outline, the film advance system will next be described. This is best understood with reference first to the layered arrangment of components between the baseplate 10 of FIG. 4a and the rear wall view of FIG. 10a. This is best shown in FIG. 7, which represents a "fold-out" sectional view along axis 7—7 of FIG. 4a. Since such views inherently distort lateral placement, FIG. 7 is primarily instructive in showing functional relationships in the drive train, as well as the relative vertical positions of the components, such as the gear train, the cam 23, the baseplate 10, the cam follower 22, the bracket 19 and the film 28, and the rear wall 114, the wall having interior and exterior surfaces 110 and 112 respectively.

It should be noted that much of the mechanism are mounted on the top surface of the dual-purpose baseplate 10. In particular the whole shutter mechanism, including a release lever 47, cocking lever 44 and shutter blade 39, all lie on the same baseplate 10. FIG. 7 also shows an installed film cassette or cartridge 8 installed, and shows details of the engagement of the cassette shroud 122 with the rear wall shroud 124.

In the center of the rear wall inner surface is a cylindrical inner hub 140 coaxially disposed with respect to the cassette spindle 138. A central gear 81 is movably mounted on hub 140, and engages with a latching gear 80 pivoted on an axle 83 to be rotated upon operation of the latching lever. Details of this system will be discussed subsequently.

The axle 18 is not mounted on the baseplate 10 because a high rigidity of the axle 18 is required to withstand the stepped-up torque derived from the motor. Instead, the axle 18 protrudes beneath the baseplate 10, the necessary bearing rigidity being provided by a metal bracket 19 which is fixed in position to the rear wall 114 by means of two screws 20 as shown in FIG. 10a. The screws 20 also fix a spacer 21, which is in the form of a circular disc, on top of the bracket 19. The top surface of the spacer 21 is in contact with the back surface of the baseplate 10 such that a thin spacing is formed between the baseplate 10 and the bracket 19. A cam follower 22 is disposed in the spacing so as to be freely-rotatable about the spacer 21; however, its motion is operated by means of the cam 23 underneath the cam gear 15. On a lever arm of the cam follower 22 is a cam pin 24 which always presses against the cam surface of the cam 23 because of the tension of a spring 33 engaged to a hook 32 (FIG. 10a) of the cam follower 22. The other end of the spring 33 is hooked to a pin 34 integral with the camera rear wall 110. The anti-clockwise rotation of the cam 23 actuates the pin 24, and hence the cam follower 22, to rotate reciprocatingly. The cam follower 22 in turn brings a claw 25 to move reciprocatingly, since the latter is fastened to the former member by means of rivets 26.

FIG. 6b shows the general scheme of peripheral engagement of the film drive system with the film disc 28. Camera wall details have been removed for clarity. In more detail, both FIGS. 6c, 6d, and 6e show a tip 27 of the claw 25 engaging a notch 29 of the disc film 28 to advance it. FIG. 6a shows the disc film 28 having 15 exposure frames symmetrically spaced about the center of the disc film, and there are also exactly 15 notches along the outer rim of the disc film 28. As can be visualized, one notch corresponds to one exposure frame in the film transport operation.

The "ready" state of the camera 1 is shown in FIG. 4a, 6b, and 6c, in which the shutter mechanism (to be discussed) is cocked and the motor drive power is disconnected. In FIG. 10a the fresh exposure frame 30 is in the imaging position ready for shutter release while the next fresh exposure frame 31 is in position ready to be transported into the imaging position in the next film advance operation. In the "ready" state the cam follower 22 and hence the claw 27 dwell in the positions shown immediately after the cam 23 has passed its highest point away from the pin 24. The spring 33 urges the cam follower 22 to swing anticlockwisely and stop in the position shown because of the abutment of a the claw 25 against a stroke-limiting stop 36. Shortly after shutter actruation, motor 11 is activated, driving the pinion gear 12, the crown gear 13, the transmission gear 14 and the cam gear 15 into rotation. The anti-clockwise rotation of the cam gear 15 brings the cam 23 into anti-clockwise rotation. Since the pin 24 follows the profile of cam 23, the cam follower 22 is actuated to swing clockwise. Consequently, the disc film 28 is rotated clockwise because of the engagement of the claw tip 27 with the edge of the notch 29 as shown in FIGS. 6b–6e. Both FIGS. 4c and 10b show the film-transport mechanism in the position when the pin 24 just rides on the highest point of the cam surface of the cam 23, corresponding to maximum stroke of the claw 25. The next fresh exposure frame 31 is thus transported to the imaging position.

Upon further rotation of the cam 23, the highest point of the cam surface then passes away from the pin 24. The actuation on the cam follower 22 by the cam 23 is thus released because of tension supplied by the spring 33. The claw 25 travels in the reverse direction as shown in FIG. 6e, the tip 27 retracting from engagement with the notch 29 because the back edge of the tip 27 is configured at a slant, and the claw itself is made of thin spring metal. The tip 27 simply slides along the emulsion surface of the film 28.

Since as the tip 27 may exert some frictional torque, during the retraction phase the disc film 28 is prevented from moving in the reverse direction, pressure from the film pressure spring 134 (FIG. 11) on the chamber door 6 holding the film disc 28 lightly pressed against the rear wall shroud 124.

The cam follower finally returns to the position as shown in FIGS. 4a and 10a and the film-transport cycle is interrupted until the next shutter release is operated. The means whereby this is accomplished involves details of switching synchronization, which will be discussed subsequently. At this point it need merely be noted that a "transport-end" switch switch S2 (see FIG. 3) consisting of a resiliently mounted contacting arm of plate 37 and a contacting pin 38 are formed to an open or circuit-breaking condition during claw retraction by engagement of a switching arm 35 on the cam follower 23 engaging the arm 37 and moving it downward.

It will be noted from the foregoing that the film advance operation is governed by purely mechanical limits in both directions. Thus, in engaging and advancing the film as shown in the figures, maximum stroke length, resulting from the clockwise rotation of the claw 22, is set by a purely mechanical limit, namely the height of the lobe of the cam 23. Because of the disengageable feature of the claw, in the retract cycle the motor drive is disconnected from the film, the claw returning to position the pawl generally within the next film notch. The limit of this retraction stroke is also achieved by purely mechanical means by the arresting of the claw 22 on by the arresting member 36. Here again, the stroke is limited by purely mechanical means, resulting in precise indexing of the stroke in both directions, and providing for a precise reliable film advance without necessity for recourse to the rather delicate and difficult to adjust film notch sensing switches currently associated with central hub drive film advance systems, such as are used in the Kodak 3000 series cameras.

During the retract phase, motor rotation continues for a brief period of time after the limit stop 36 is engaged; however, because the engagement of the cam pin 24 against the cam 23 exists purely because of the force exerted by spring 33, when the claw 22 strikes the arresting member 36 the cam 23 simply moves out of engagement with the cam pin 24. Thus, no sudden stopping torques are reflected into the motor drive system.

In practice, motor drive shutdown is achieved by adjusting the position of the outer end of the switching arm 37 so that contact is broken between this arm and the contact pin 38 shortly before the claw 22 strikes the limit stop 36, thereby terminating the supply of electrical power to the motor drive system. The motor thereafter shortly coasts to a stop, carrying the cam 23 slightly beyond the position corresponding to an engagement of the claw 22 with the limit stop 36. Thus, precision of motor timing to secure an exact film advance, as is routinely encountered with fixed nondisengageable drive systems is completely unnecessary because of the selective disengagement features of the peripheral advance system.

Additionally, it will be recognized that a substantial reduction in gearing is secured by means of the peripheral drive system as contrasted with central hub drive systems, since the entire film advance sequence is governed by one rotation of the cam 23, whereas central drive systems require a first reduction in order to provide a once-per-frame rotary motion to the drive system to recock the shutter (to be discussed), and subsequent a 15 to 1 reduction inserted thereafter in the train to advance the film to successive frames. By eliminating this extra central gearing the central area in the vicinity of the disc hub rotation axis is kept clear, allowing direct through-access to the film hub, resulting in an advantageous situation for end-of-film sensing, as will subsequently be discussed, as well as a general reduction in the number of centrally located components. As a result of this, the central area of the motor board of FIGS. 4a–4d can be dedicated to the remaining mechanical linkages of the system, in particular the shutter, its release system, and its recocking system, as will be discussed next.

FIG. 4a shows the shutter mechanism in the cocked state, i.e. the "ready" state of the camera. A shutter blade 39, pivoted upon axle 41, is in the closed position covering a shutter hole 40 formed on the baseplate 10. The shutter blade 39 is urged to such position by means of a spring 42, and the rim of the shutter blade 39 presses against a stopper 43 erected on the baseplate 10.

A cocking lever 44, pivoted upon axle 45, is held in the cocked position by engagement with the cocking part 48 of a release lever 47. The release lever 47 is pivoted upon axle 49. The axles 41, 45 and 49 are erected on the baseplate 10. The release lever 47 is urged anti-clockwise to be retained in the cocked position by means of a tension spring 51 exerting tension on a pin 50 mounted on the release lever. The other end of the spring 51 is hooked to a contact pine 52 which is also erected on the baseplate 10. The cocking lever 44 is urged anti-clockwise by means of a spring 56 attached to a hook 55 formed on the contact plate 53, the latter being fixed to the cocking lever 44 by means of the screws 54. The other end of the spring 56 is hooked to a fixed pin 57 erected on the baseplate 10.

FIG. 4a also shows contact plates 67 and 68 flexed to the baseplate 10 by means by rivets 69 and 70 respectively. These elements form part of the electrical switching system used to sense the cassette, and will be discussed subsequently.

FIG. 4b shows the shutter system during the initial phase of release. Depression of a shutter release button (not shown) urges the release arm 71 of the release lever 47 rotate it clockwise against the tension of spring 51 to release the engagement of the cocking part 48 with the cocking lever 44. As a result, the cocking lever 44 rotates rapidly anticlockwise because of the tension in the spring 56. The end of a striker 58, fixed to the cocking lever 44 by means of screw 59 and locating pin 60, then strikes an anvil 62 of the shutter blade 39. Thus, the shutter blade 39 is swung clockwise to uncover the shutter hole, and the exposure frame 30 is thus exposed. At its maximum swing a tab 61 on the shutter blade 39 forces contacts 63 and 64, mounted on baseplate 10 by rivets 65 and 66, to touch each other to fire the builtin flash element. Formally, these elements comprise the switch S8 of FIG. 3.

The cocking lever 44 finally stops its anticlockwise rotation when the contact pin 52 is in abutment with a contact plate 53 mounted on the cocking lever. These two elements comprise the transport-start switch S3 of FIG. 3, to be discussed subsequently.

The closure of the transport start switch S2 causes energization of the motor 11; causing the anticlockwise rotation of the cam 23, as previously described in conjuction with the actuation of the film transport system. As will subsequently be discussed, motor energization is inhibited in any case until the shutter button (not shown) is released, whereupon removing pressure from the release arm 71 of the release lever 47 allows spring 51 to rotate the release lever 47 at a clockwise as shown in FIG. 4C.

As the motor 11 drives the cam 23 anticlockwise, inducing a clockwise rotation of the cocking arm 44, the release lever 47 is urged clockwise by camming action between the end thereof and the cocking lever 44 as indicated. Simultaneously, during this retraction operation the striker 58, which is a flexible member attached to the cocking lever having a camming downwardly projecting surface 58', as shown in FIGS. 9 and 9A, moves downward as shown in FIG. 4C to be cammingly upwardly urged over the end of the anvil 62 to slide thereover by the engagement of the camming surface 58' on the striker 58 and a facet 62' on the anvil 62. By this upward flexure the striker slides over the anvil of the shutter 39 on the recock cycle. FIG. 4D shows the end of the recock cycle, with the cocking lever 44 and the release lever 47 again in latched engagement ready for the next exposure.

It will be noted, however, that the rotation of the cam 23 is not yet complete, as was the case in FIG. 4a. Additional rotation of the cam 23 has no further effect on shutter cocking but merely serves to complete the film advance cycle previously discussed. Rotation of the cam 23 to this final position is terminated by electrical switching means to be subsequently discussed, and the camera is again ready for a new exposure.

In contrast with conventional disc cameras, wherein the entire central area of a baseplate corresponding to element 10 in FIG. 4A must be dedicated to step down gearing to drive a cassette-engaging spindle mounted coaxially with respect to the interior hub 140, by utilizing a peripheral drive system as previously described, this entire area is now clear and can carry the entire remaining shutter and shutter cocking mechanism, as well as virtually all the principal remaining switching elements necessary for complete cycling of the camera. By eliminating this central gear cluster, the present system grossly reduces the complexity of automatically driven disc cameras, thereby reducing their price.

With respect to switching synchronization to control the actuation of the camera through a complete film advance and shutter cocking cycle, three salient points with respect to the motor stop switch consistency of elements 37 and 38 of FIGS. 10A and 10B and the motor start switch represented by elements 52 and 53 of FIGS. 4A-4D will herewith be recapitulated. With the camera in the ready state and no pressure on the shutter button 5 (FIG. 1) an associated switch S1 (not shown in other drawings, and shown symbolically in the schematic diagram of FIG. 3) is in the normally closed state. Slight depression of the shutter button 5 opens switch S1. This is done for delay purposes to facilitate synchronization. In the ready state the motor stop switch S2 (FIG. 3) is held open by the pressure of arm 35 as shown in FIG. 10A. The motor start switch, as shown in FIG. 4A, is held open by the latching state of the shutter mechanism.

Upon partial depression of the shutter button 5 (FIG. 1) motor delay switch S1 is opened, and mechanical pressure by linkages (not shown) is brought to bear on release arm 71 of release lever 47, thereby tripping the shutter system and causing the cocking lever assembly 44 to rotate to close the motor start switch S3. With reference to the schematic diagram of FIG. 3, it will be presumed for the moment that the switch is S4, S5, and S6 (all associated, as will subsequently discussed, with the film door and with end-of-film and cassette inserting sensing) are all closed. The detailed nature of the switches and their interaction will be subsequently discussed.

Immediately upon closure of the motor start switch S3, it will be seen that power from the battery B (not shown in pictorial drawings) flows to the normally closed terminal T1 of a single pole-double-throw relay switch RS (also not shown in pictorial drawings) and also to one end of the relay coil C, the lower or opposite end of the relay coil returning to the negative side of the battery B through the closed motor start switch S3 and either of the associated switches S6 and S5. Thus, the relay coil C is energized, and will remain so as long as either the motor start switch S3 or the motor stop switch S2 is closed.

Initially, only rotor start switch S3 closes. As a result of the energization of the relay coil C, motor R of the relay switch RS is drawn downward to close against terminal T2, and it is clear that when the shutter button 1 is released after tripping the shutter, switch S1 then reverts to its normally closed state. Motor power will then be delivered to the motor 11 to drive the power train and the cam 23 into rotation.

Referring to FIG. 10A, it will be seen that only a slight rotation of the cam 23 suffices to lift the switching arm 35 of the cam follower 22 to release pressure against arm 37 of the motor stop switch S2, thereby closing switch S2 as well. Referring to FIG. 4C, cocking arm 46 of cocking lever 44 is so disposed that in a tripped position of the cocking lever assembly 44, there is no immediate contact with the cam 23.

Thus, the initial motion necessary to close switch S2 of FIG. 10A is insufficient to move contact plate 53 of cocking lever 44 out of contact with contact pin 52, as a result of which the motor start switch S3 remains closed at least through an initial phase of the motor drive operation, in any case for sufficiently long to establish motor stop switch S2 in a closed condition.

Thereafter, as motor drive continues, film advance and recocking can continue as previously described, the closed state of motor stop switch S2 maintaining drive power to the motor irrespective of the re-opening of the motor start switch S3.

Finally, at the end of the cocking and film advance cycle, with the shutter mechanism recocked and the motor restart switch again latched in an open condition, the cam 23 rotates to the configuration shown in FIG. 10A, again driving the motor stop switch S2 to an open condition to terminate the cycle. The camera is now cocked, properly advanced, and ready for a fresh actuation. As previously described, immediately after the tripping of the shutter, the closure of the flash synchronizing contact 65 and 63 (FIG. 4a) is used to trigger the associated flash unit F shown in FIG. 3.

The interconnections of the various switching elements on the baseplate 10 of FIG. 4A is shown in FIG. 5, the letter designations on the metallizations corresponding to the indicated leads of FIG. 3. In FIG. 3 the function of the power switch S7 is to supply optional power to the flash unit F if flash exposure is desired.

FIG. 5 shows the metalizations on the baseplate 10 in shaded outline, and showing in particular the connectivity between the contact pin 52 and the contact plate 53 on cocking lever 44 comprising motor start switch S3. The pin 52 is riveted to metallization pad MG. The cocking lever assembly 44 is made of insulating material; however, the arm 53 is made of electrically conducting material. A conducting path thus exists between arm 53, spring 55, and post 57 riveted to and electrically contacting metallization MD via hole 57' (FIG. 5). Thus, the motor start switch S3 is closed by closing the contact between metallization ME and MD by tripping the shutter switch to bring elements 52 and 53 into contact, as previously described.

Switches S5 and S6 serve respectively to sense the presence of an inserted cassette an to sense and end-of-film position of the cassette disc. As will subsequently be shown, when a cassette is inserted switch S5 will be open, and under normal circumstances switch S6 will be closed by engagement with the cassette hub. The nature of these switches is best seen in FIG. 8, which shows a fold-out sectional view generally along line 8—8 of FIG. 4A. Switch element 68 is a resilient generally flat metal strap held in position on the baseplate 10 by means of a rivet 70, the righthand end of the strap 68 B having a passage 142 extending therethrough, to accommodate a cassette detector pin 73, the lower end of the pin as shown in FIG. 8 exiting the wall 110 to bear against the upper surface of an inserted cassette 8. A cassette sensing pin 73 is normally held down by the resilient force of the second strap-like element 67, shown in FIG. 4A in more detail, this strap 67 similarly being held to the baseplate 110 by rivets 69-69'. Insertion of a cassette as indicated in FIG. 8 pushes sensing pin 73 upward to move arm end 67b out of contact with arm end 68b. Formally, this contacting action is indicated as actuation of switch S5 in FIG. 3.

As seen in FIG. 8, the left-hand end of strap 67 is bent upward to lie above the baseplate 110, with the leftmost end of the strap element 68 disposed below it. A hub sensing pin 74 disposed within a passage 144 passing through the hub spindle structure 138 and slightly off to one edge thereof, urges the end of contact plate 68 upwards such that the arm 67(a) of the contact plate 67 is moved into contact with the contact plate 68 because of the actuation of the pin 74, which projects outboard against the internal rim of central hub 72 of the disc film 28. However, as shown in FIG. 6a there is a notch 75 on the internal rim of the central hub 72. The position of the contact point between arm 67(a) and plate 68 is so disposed such that when the fifteenth exposure frame has just been transported to the imaging position, the pin 74 falls into the notch 75 because of the resilience in plate 68. This results in the opening of the end-of-film switch 56 in FIG. 3.

In such a state, shutter release to the fifteenth exposure frame is still operable but there will be no further transport of film. Such a function is necessary because further transport may cause damage to either the film or the film-transport mechanism, since the film cartridge is internally blocked against further advance for double exposure prevention.

It will be noted that if no cassette is inserted, then pin 74 will be urged outward to a circuit-breaking condition. Were it not for the simultaneous closure of cassette sensing switch S5 upon similar outward motion of pin 73 upon cartridge removal, it would be impossible to test the camera without inserting a cassette and possibly wasting film.

It will be appreciated that such a through-the-wall end-of-film sensing system actuating a termination switch on the motor board cannot be carried out on central drive systems because of the necessity for the emplacement of the final drive gear pivotally mounted about the film rotation axis, thereby occluding this region from access by the sensing element. This is a further novel advantage derived from referring the drive engagement to the periphery of the film disc rather than to the hub. It is this same central area space saving that also allows the entire shutter and shutter cocking mechanism to be disposed on the central area of the motor board 10 as shown in FIGS. 4a–4d.

FIG. 10a also shows the latching lever 7 in the latched position, causing contact plates 76 and 77 to touch and thus close the unloading switch 54 of FIG. 3. The latching lever has two small recesses 78 and 79, which serve to lock the lever 7 in the latched unlatched positions respectively. In the position shown in FIG. 10a, a spring-loaded metal ball (not shown) falls into the recess 78 and locks the latching lever 7 in the latched position. The latching lever 7 also has a gear part 80 which mates with the central gear 81 mounted underneath the bracket 19 and pivoted, as previously described, to the camera chassis coaxially with the center point of the hub 72 of the film cartridge 8. The latching lever 7 is pivoted to an integral pin 83.

When the latching lever 7 is closed to the position shown in FIG. 10a, the central gear 81 is rotated clockwise and in turn the dark slide of the film cartridge 8 is levered to uncover the imaging area by the previously mentioned engagement of slide pin 118 mounted on gear 81 engaging the slide slot 120 of the cassette 8 (FIG. 11).

When the latching lever 7 is unlatched by clockwise rotation (FIG. 10A) the contact plates 76 and 77 are released from touching. Thus, the unloading switch 54 is opened. As the latching lever 7 is rotated to the fully unlatched positions as shown in FIG. 9c, the central gear 81 is rotated anticlockwise, first actuating the dark slike to cover up the imaging area, whereupon an extension part 82 of the central gear 81 engages an extension 84 (See FIG. 4a) of the release lever 47. The extension 84 is shown alone and shaded in FIG. 9c. The release lever 47 is thus forced to rotate clockwise to release the cocking lever 44. As a result the shutter is released. This is necessary so as to close the motor start switch 53, for reasons which will soon become evident. The exposed film cartridge is unloaded.

The camera is now ready for loading a new film cartridge. When the latching lever 7 is rotated to a closed position, first the extension 82 retracts from actuation on the release lever 47, next the dark slide of the film cartridge is opened (if a film cartridge is loaded), and finally the unloading switch S4 is re-actuated to close. Since the shutter has been tripped, closing switch S3, then immediately the film-transport circuit of FIG. 3 is actuated, and the first exposure frame is transported to the imaging position in the manner similarly described.

FIGS. 12A and 12B show expanded views of the cassette engaging shroud 124 shown in FIG. 11. It will be seen that the pawl 27 moves within a generally arcuate cutout 128 disposed outboard of a similarly arcuate outwardly projecting generally planar shroud rail 142. A complementary shroud rail 140 is disposed at the opposite margin of the exposure window 126. Both rails 140 and 142 are disposed to be generally parallel, and have coplanar outer faces, the two faces being configured to lie in the imaging plane of the lens 2 of FIG. 1, the spring 134 on the rear door 6 as shown in FIG. 11 serving to press the film disc 28 with modest pressure against these two faces to keep the film properly flattened in the focal plane of the lens for sharpest exposure. It will be noted that the orientation of rails 140 and 142 is generally tangential to the direction of film travel. Because of this disposition, and because they are placed to be outboard of the actual picture taking area of the film, there is no necessity for selectively removing the pressure induced by spring 134 during film advance, since any scratching so induced will be outside of the final picture. Moreover, the constant light pressure drag on the system facilitates the camming disengagement of the pawl 27 on the retraction stroke, as previously described with respect to FIGS. 6A–6D.

The remaining elements of the shroud 124 consists of a pair of rails 144 and 146 disposed adjacent the remaining cassette window margins and transversely to the direction of film motion. By configuring the outermost surfaces of these transverse rails 144 and 146 to lie slightly below the common plane of the corresponding outer surfaces of the rails 140 and 142, the transverse elements are kept out of engagement with the film surface during film advance, so as to remove any possibility of film scratching from this source. By this means the necessity for a separately actuatable linkage to provide film flattening pressure selectively only during the exposure phase, removing this pressure during film advance to prevent film scratches, is completely eliminated.

Thus, there has been described a camera drive system which accomplishes all of the previously outlined desirable features in a disc camera. First, by using a peripheral engagement of the film with a releasable pawl having a mechanically limited stroke in both directions, a rapid film advance is secured while at the same time removing the space-consuming central gear reduction system associated with central drive systems. Second, by allowing direct access to the hub of the disc film, an end-of-film metering system is allowed which simply and reliably terminates system drive actuation at an end-of-film condition. Third, with the exception of the reciprocating pawl carrying claw, all elements of the motor drive system, as well as the shutter cocking and actuation system, are incorporated into a single motor board employing printed circuit interconnections, thereby substantially reducing assembly wiring costs and facilitating ease of access for test purposes as well as repair. Fourth, by modifying the film engaging shroud to have its film engaging surfaces disposed tangentially with respect to film rotation and outboard of the picture taking area, a light constant pressure may safely be applied to the disc for film flattening purposes, this light pressure also serving the function of facilitating the release of the peripheral drive system on the retract stroke. The associated outboard mechanical linkages used by the prior art to sequentially apply and relieve this pressure are completely eliminated.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out the invention, but that the inventions will include all embodiments falling within the scope of the appended claims.

We claim:

1. In an electrically driven still camera having a housing with a film chamber defined in part by a rear film chamber wall having a projecting hub support adapted to received a disc film cassette, said film cassette comprising a thin housing with an exposure window and having a film disc rotatable therein, said film disc having a central hub portion with a generally circular aperture to fit over said hub support and an eccentrically disposed slot, said film disc having a peripheral notch opposite each film frame, and motor drive means disposed within said housing for rotatingly advancing said film disc to present successive frames thereof for exposure in said window to image-forming light, the improvement wherein said hub support on the outer face of said rear chamber wall forms a stationary or non-driven pivot support for said film disc hub portion and there is provided in said housing a film disc driving member driven by said motor drive means and having a portion for engaging one of said peripheral notches of said film disc and advancing said film disc one frame distance after each frame exposure; and sensing means on the portion of said rear chamber wall disposed opposite said eccentric film disc hub slot for detecting the presence of said film disc slot only after the last frame of said film disc has been moved opposite said exposure window; and control means responsive to said sensing means for detecting the presence of said hub disc slot and disabling said motor means so as to prevent further film advancement when said eccentric slot is advanced to a position indicative of an end-of-film condition.

2. The camera of claim 1 wherein said sensing means includes mechanical member mounted on said rear chamber wall and urged outwardly to be in the path of movement of said slot so it can drop into the slot, said control being responsive to the movement of said member into said slot.

3. In an electrically driven camera having a housing with a film chamber defined in part by a rear chamber wall having a projecting spindle adapted to receive a disc film cassette, said film cassette comprising a thin housing with an exposure window and having a film disc rotatable therein, said film disc having a central spindle-receiving portion with a generally circular aperture to fit over said spindle and a peripheral notch opposite each film frame, and said rear film chamber wall having an interior face in part defining a parts-containing chamber in said housing, and motor drive means including an electric motor disposed within said parts-containing chamber for rotatingly advancing said film disc to present successive frames thereof for exposure in said window to image-forming light, the improvement wherein said spindle on the outer face of said rear chamber wall forms a stationary or non-driven pivot support for said film disc, and there is provided in said housing film disc driving means driven by said motor drive means and having a portion for engaging one of said peripheral notches of said film disc so as to rotate said film disc one frame distance after each frame exposure, said parts-containing chamber further including means for automatically cocking the shutter of said camera with each film-advancing operation, and said part-containing compartment includes a generally planar support board having disposed thereon at least said electric motor and said shutter cocking means, said support board being disposed with one major face thereof closely confronting and generally parallel to the interior face of said rear film chamber wall.

4. The camera of claim 3 wherein said camera has electric control circuitry, and said support board is also a printed circuit board containing substantially all of said circuitry.

5. The camera of claim 3 wherein said film disc driving means includes a pivotable member on the side of said rear chamber wall remote from said film chamber having a portion passing through an opening in said rear chamber wall and a pawl on the end thereof for engaging one of said peripheral notches of said film disc, said support board supporting means responsive to the operation of said electric motor for oscillating said film disc driving member.

6. In an electric motor driven camera having a housing with a film chamber having a spindle thereon adapted to receive a disc film cassette, said film cassette comprising a thin housing with an exposure window and having a film disc rotatable therein, said film disc having a spindle-receiving portion with a generally circular aperture thereon to fit over said spindle, said film disc having a peripheral notch opposite each film frame, and motor drive means disposed within said housing for rotatingly advancing said film disc to present successive frames thereof for exposure to image-forming light passing through the exposure window of said cassette, the improvement wherein said spindle form a stationary or non-driven support for said film disc whose circular aperture fits and is rotatably supported thereon, and there is provided in said housing film disc engagement means driven by said motor drive means and carrying a pawl on the end thereof for engaging one of said peripheral notches of said film disc so as to rotate said disc one frame distance after each frame exposure, said motor drive means actuating said film engaging means to drive said pawl in a two-stroke reciprocating motion along the periphery of said film disc starting from an initial position where said pawl is in one of said film disc notches and proceeding in a first or film-advancing stroke direction, and thereafter in a second or pawl-retracting stroke direction to return to said initial position, said pawl having associated therewith means for releasably disengaging from the engaged notch in said retraction stoke to disengage from said engaged notch to return to said initial position and engage the next film notch, said motor drive means including a disengageable cam-and-follower coupling for actuating said film disc engagement means to said reciprocating motion, the length of said advancing stroke being governed by the maximum extension of the lobe of a cam in said coupling, said coupling having means for releasably disengaging from said engagement means during said retraction stroke, the length of the said retraction stroke being set by arresting engagement of a portion of said engagement means with a limit stop, said coupling disengaging said motor drive means from said engagement means thereafter in said retraction stroke and again engaging it by further rotation of said cam to provide a subsequent advancing stroke.

7. The camera of claim 6 wherein said pawl is carried in a light spring arm and has a steep-sided drive shoulder on one side and an inclined release shoulder on the other side thereof.

8. The camera of claim 6, wherein said means for disengaging said pawl includes a camming film-engaging surface on said pawl and resilient means for urging said pawl against the film such that said pawl is urged to arrestingly engage with a film disc notch when moved in said film advancing stroke and to cam out of engagement therewith against the force of said resilient member on each said retraction stroke.

9. The camera of claim 8 further comprising pressure means for providing rotation-resisting pressure to said film disc at least during said retraction stroke.

10. The camera of claim 9 wherein said pressure means provide said pressure to said film disc continuously and in substantially the same degree throughout both of said strokes and between film advancing operations.

11. In a combination of a still camera containing a disc film cassette therein, said camera having a housing with a film cassette chamber containing said cassette and area exposed to an aligned with respect to an imaging axis of the camera, said disc film cassette including a pair of spaced confronting walls sealed together at the edges thereof to define a light-tight film chamber, the interior of said cassette being externally accessible through at least one opening in one of said walls which includes an exposure window opening exposed to an aligned with the imaging axis of the camera, said cassette containing a flexible light-sensitive film disc mounted between said walls and having a spindle-receiving opening in the center thereof, a spindle in said film chamber projecting into said spindle-receiving opening of said film disc rotatably to support the same, the film disc futher having a peripheral notch opposite each area thereof to be imaged through said exposure opening window; and pressure applying means in said film chamber opposite said exposure window for applying a film flattening and rotating-retarding pressure substantially only to that portion of the film disc located opposite said exposure window opening in said cassette wall to fixedly position the film disc thereat in a predetermined imaging plane of the camera, the improvement wherein the pressure applying means maintains said rotation-retarding pressure on said film disc continuously, so that said pressure is applied during a picture-taking operation and during film advancement, and there is provided film advancing means including motor drive means in said housing, a pawl in said film cassette chamber coupled to said motor drive means, said pawl extending through one of said cassette walls at a point adjacent to said imaging axis and engageable with a peripheral notch of said film disc thereat, the pawl when driven by said motor drive means being moved back and forth so as to first rotate the film disc one frame distance and then return to an initial position when it can engage the next film disc notch; and means for operating said motor drive means to effect momentary back and forth movement of said pawl to effect a film advancing operation following each film exposure.

12. The camera of claim 11 wherein said pawl is configured to arrestingly engage an edge of one peripheral notch of said film disc when driven in a first direction so as to rotate said film disc one frame distance, and to releasingly disengage therefrom when driven in the opposite direction, so that repeated actuation cycles of said pawl sequentially advances said film disc one frame distance.

13. The camera of claim 12 wherein said pawl is carried on a light spring arm and has a steep-sided drive shoulder on one side and an inclined release shoulder on the other side thereof.

14. The camera of claim 11 wherein said pawl passes through said cassette wall exposure window opening to engage a film disc notch in said window.

* * * * *